United States Patent

Kayanoki et al.

[11] Patent Number: 5,171,806
[45] Date of Patent: Dec. 15, 1992

[54] OPTICAL MATERIAL AND COMPOSITION FOR OPTICAL MATERIAL

[75] Inventors: Hisayuki Kayanoki, Takarazuka; Koichi Maeda; Akio Takigawa, both of Nishinomiya, all of Japan

[73] Assignee: Nippon Sheet Glass Co., Ltd., Osaka, Japan

[21] Appl. No.: 729,411

[22] Filed: Jul. 12, 1991

[30] Foreign Application Priority Data

Jul. 13, 1990 [JP] Japan .................. 2-186576

[51] Int. Cl.⁵ ............................. C08F 22/40
[52] U.S. Cl. .................... 526/262; 526/321; 526/323.1
[58] Field of Search ............ 526/262, 321, 323.1

[56] References Cited

U.S. PATENT DOCUMENTS 4,868,261 9/1989 Kobayashi et al. .............. 526/262
4,918,152 4/1990 Moritani et al. .................. 526/262

FOREIGN PATENT DOCUMENTS 166214 12/1981 Japan .
51706 3/1985 Japan .
72748 4/1986 Japan .
123614 6/1986 Japan .
46213 2/1988 Japan .
295012 12/1988 Japan .................. 526/262
20189316 7/1990 Japan .................. 526/262

Primary Examiner—Joseph L. Schofer
Assistant Examiner—Alex H. Walker
Attorney, Agent, or Firm—Wenderoth, Lind & Ponack

[57] ABSTRACT

A composition for an optical material, which comprises an N-phenylmaleimide, a di(meth)allyl diphenate and a bisphenol ester.

The N-phenylmaleimide, the di(meth)allyl diphenate and the bisphenol ester are contained in amounts of 1 to 50% by weight, 5 to 50% by weight and 1 to 30% by weight, based on the total weight of these components, respectively, The composition affords a three-dimensionally crosslinked resin by radical polymerization. The resin is useful for an optical material.

2 Claims, No Drawings

OPTICAL MATERIAL AND COMPOSITION FOR OPTICAL MATERIAL

DETAILED DESCRIPTION OF THE INVENTION

This invention relates to an optical material having a low specific gravity and being excellent in transparency, heat resistance and processability, and an easily moldable composition therefor.

Various synthetic resins as a substitute for inorganic glass have been hitherto proposed and put into practical use. Diethylene glycol bisallylcarbonate is a typical example thereof. However, it has a defect in that its refractive index is as low as 1.50.

For this reason, optical materials containing an aromatic ring, halogen atom(s) or sulfur atom(s) in the molecule have been proposed (see, for example, Japanese Laid-Open Patent Applications Nos. 166,214/1981, 72,748/1986 and 123,614/1986), and some of them have been put into practical use.

Further, polyurethane or polythiourethane resins produced by reacting an isocyanate compound with a polyol or a polythiol have bee proposed (see, for example, Japanese Laid-Open Patent Applications Nos. 51,706/1985 and 46213/1988) and some of them have been put into practical use.

However, these conventional resins have not always satisfied all the physical properties required. For example, resins containing halogen for a high refractive index have high specific gravity of 1.45 or more. Most of materials containing a (meth)acrylic resin show inferior impact resistance, although these materials are easily moldable. Urethane resins show poor moldability in cast polymerization, although some of them have good impact resistance.

Therefore, one object of this invention is to provide a novel optical material.

Another object of this invention is to provide a novel optical material having a low specific gravity and being excellent in transparency, heat resistance and processability.

Further, another object of this invention is to provide a composition from which to prepare the above optical material of this invention.

According to this invention, the above objects and advantages of this invention are achieved, firstly, by a composition for an optical material, which comprises:
(A) N-phenylmaleimide of the general formula (1)

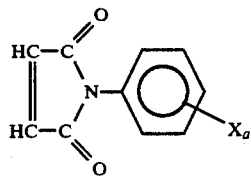

wherein X is an aliphatic group having 1 to 5 carbon atoms, an aromatic group or a halogen atom and a is an integer of 1 to 5,
(B) di(meth)allyl diphenate of the general formula (2),

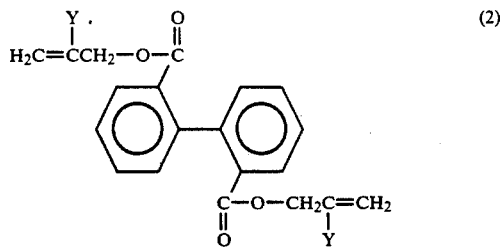

wherein Y is a hydrogen atom or a methyl group, and
(C) bisphenol ester of the general formula (3),

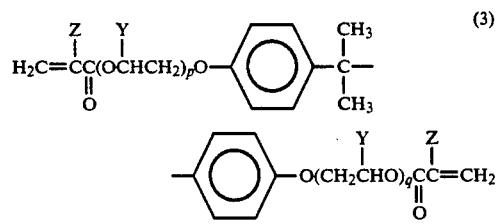

wherein each of Y and Z is, independently of the other, a hydrogen atom or a methyl group, p and q are positive integers, and p+q equals 2 to 50, the amount of the above component (A) being 1 to 50% by weight based on the total weight of the components (A), (B) and (C), the amount of the above component (B) being 5 to 50% by weight based on said total weight, the amount of the above component (C) being 1 to 30% by weight based on said total weight.

The N-phenylmaleimide used in the composition of this invention has the above general formula (1), in which X is an aliphatic group having 1 to 5 carbon atoms, an aromatic group or a halogen atom.

As the aliphatic group having 1 to 5 carbon atoms, a linear or branched alkyl group having 1 to 5 carbon atoms is preferred. Such an aliphatic group is selected from methyl, ethyl, n-propyl, isopropyl, n-butyl and n-pentyl groups. As the aromatic group, a phenyl or diphenyl group is preferred. As the halogen atom, fluorine, chlorine and bromine are preferred.

In this invention, the N-phenylmaleimide of the above general formula (1) preferably includes N-phenylmaleimide, N-(2-chlorophenylmaleimide), N-(2,6-diethylphenylmaleimide), N-(2,6-dimethylphenylmaleimide), N-(2,4,6-tribromophenylmaleimide) and N-(4-phenylphenylmaleimide).

These N-phenylmaleimides may be used alone or in combination.

The di(meth)allyl diphenate (B) used in this invention is represented by the above general formula (2), in which Y is a hydrogen atom or a methyl group. The di(meth)allyl diphenate (B) of the general formula (2) includes, for example, diallyl diphenate and dimethallyl diphenate. These may be used alone or in combination.

Further, the bisphenol ester (C) used in this invention is represented by the above general formula (3), in which each of Y and Z is, independently of the other, a hydrogen atom or a methyl group, and each of p and q is a positive integer provided that p+q is in the range of from 2 to 50.

When p+q is less than 2, the bisphenol portion of the bisphenol ester contributes to the properties of the component (C) to excess, and when p+q is more than 50, its alkylene oxide portion contributes to the properties of the component (C) to excess. In none of these cases, the objects of this invention can be achieved.

Preferred are those bisphenol esters of the general formula (3) in which p+q is in the range of from 4 to 50, especially 20 to 50.

The bisphenol ester in this invention include, for example, 2,2'-bis(4-acryloxyethoxyphenyl)propane, 2,2'-bis(4-methacryloxyethoxyphenyl)propane, 2,2'-bis(4-acryloxydiethoxyphenyl)propane, 2,2'-bis(4-methacryloxydiethoxyphenyl)propane, a dimethacrylic ester of the general formula (3) in which p+q equals 10 (e.g. NK ester BPE-500, supplied by Shin Nakamura Chemical Co., Ltd.) and a dimethacrylic ester of the general formula (3) in which p+q equals 30 (e.g. NK ester BPE-1300, supplied by Shin Nakamura Chemical Co., Ltd.).

The above bisphenol esters may be used alone or in combination.

The above bisphenol esters may be used alone or in combination.

The composition of this invention contains 1 to 50% by weight, based on the total amount of the components (A), (B) and (C), of the N-phenylmaleimide as the component (A).

As the amount of the component (A) increases, the polymer produced by polymerization of the composition exhibits higher improvement mainly in heat resistance. When the amount of the component (A) is less than 1% by weight, the improvement in heat resistance is insufficient, and the objects of this invention cannot be achieved. When the amount of the component (A) exceeds 50% by weight, a color of the monomer mixed liquid remains even after the polymerization, and the resultant product has an undesirable color.

The amount of the component (A) is preferably 5 to 30% by weight on the basis of the above-described total amount.

The component (A) has an effect on improvement in heat resistance of the polymer as described above. Moreover, the component (A) makes it easy to control the polymerization of the composition and makes it possible to easily produce a uniform polymer free from non-uniformity of polymerization observed as striae.

The composition of this invention contains 5 to 50% by weight, based on the above-described total amount, of the di(meth)allyl diphenate as the component (B).

As the amount of the component (B) increases, the polymer produced by polymerization of the composition exhibits a higher refractive index and a lower specific gravity. When the amount of the component (B) is less than 5% by weight, these properties cannot be improved. When the amount of the component (B) exceeds 50% by weight, the composition shows poor moldability, or the resultant resin shows an inferior dispersion value. That is, the resin shows an Abbe's number of 30 or less, and exhibits inferior performance as an optical lens, especially as an opthalmic lens. Further, the resin shows inferior impact resistance when subjected to a falling ball impact test, and for example, it is difficult to handle an optical lens formed of such a resin. Furthermore, unreacted monomer remains in the polymer, and in consequence, heat-resistance and transparency of the polymer is apt to deteriorate.

The amount of the component (B) is preferably 10 to 45% by weight based on the above-described total amount.

Further, the composition of this invention contains 1 to 30% by weight, based on the above-described total amount, of the bisphenol ester as the component (C).

As the amount of the component (C) increases, the formability in replication with a glass mold is improved, and the resin produced by polymerization of the composition shows an improvement in moldability. When the amount of the component (C) is less than 1% by weight, a releasing from a mold is liable to occur, and the moldability is deteriorated. When the amount of the component (C) exceeds 30% by weight, the composition exhibits an extraordinarily high viscosity, the productivity is deteriorated, and a releasing from a glass mold is also liable to occur.

When the composition comprising an ordinary allyl ester such as diethylene glycol bisallyl carbonate and an ordinary (meth)acrylate such as polyethylene glycol methacrylate instead of the (B) and (C) components is polymerized, the resultant polymer becomes opaque and fails to have a transparency.

The composition of this invention comprises components (A), (B) and (C) as specified above. In addition to these components, the composition of this invention may further contain other monomer as required.

Differing from any of the above components (A), (B) and (C), the "other monomer" is a compound (D) containing at least one radical-polymerizable functional group having a carbon-carbon double bond in the molecule. The compound (D) is preferably used to adjust the refractive index of the resin, adjust the viscosity of the composition and regulate the crosslinking density of the resin produced by polymerization, without deteriorating the physical properties of the composition and the resin produced therefrom. As the above carbon-carbon double bond, preferred are vinyl, acryl and allyl groups.

The monomer (D) is selected from compounds containing one radical-polymerizable functional group having a carbon-carbon double bond in the molecule such as styrene, 4-chlorostyrene, bromostyrene, dibromostyrene, phenyl acrylate, phenyl methacrylate, phenoxyethyl acrylate, phenoxyethyl methacrylate, benzyl methacrylate, dicyclopentenyl acrylate, dicyclopentenyl methacrylate, allyl benzoate, etc.; and compounds containing at least two radical-polymerizable functional groups having carbon-carbon double bonds in the molecule such as monomers having a vinyl group such as divinylbenzene, etc., bisphenol A derivatives such as 2,2'-bis(4-acryloxy-3,5-dibromophenyl)propane, 2,2'-bis(4-methacryloxy-3,5-dibromophenyl)propane, 2,2'-bis(4-acryloxyethoxy-3,5-dibromophenyl)propane, 2,2'-bis(4-methacryloxyethoxy-3,5-dibromophenyl)propane, etc., bisphenol S derivatives such as 2,2'-bis(4-acryloxyphenyl)sulfone, 2,2'-bis(4-acryloxyethoxyphenyl)sulfone, 2,2'-bis(4-acryloxyethoxy-3,5-dibromophenyl)sulfone, etc., thiodiphenol derivatives such as bis(4-acryloxyphenyl)sulfide, bis(4-methacryloxyphenyl)sulfide, bis(4-acryloxyethoxyphenyl)sulfide, bis(4-methacryloxyethoxy-3,5-dibromophenyl)sulfide, etc., monomers having a methacryl group as an aliphatic alcohol derivative such as ethylene glycol diacrylate, tetraethylene glycol diacrylate, nonaethylene glycol diacrylate, diethylene glycol dimethacrylate, tetraethylene glycol dimethacrylate, nonaethylene glycol dimethacrylate, 1,6-hexanediol diacrylate, 1,9-nonanediol diacrylate, neopentyl glycol dimethacrylate, trimethylolpropane trimethacrylate, etc., and monomers having an allyl group such as bisallyl terephthalate, bisallyl isophthalate, triallyl trimellitate, etc.

The composition of this invention may contain the other monomer as a component (D) in the amount of 1 to 50% by weight based on the total amount of the components (A), (B), (C) and (D).

The composition of this invention, which contains the above components (A), (B), (C) and optionally (D), is subjected to radical polymerization to give a three-dimensionally crosslinked resin. This three-dimensionally crosslinked resin is very effective as an optical material.

The radical polymerization is carried out by heating the composition of this invention in the presence of a radical polymerization initiator or by irradiating the composition with actinic rays such as UV rays and radiations.

The radical polymerization initiator is selected, for example, from azo compounds such as 2,2'-azobis(2-cyclopropylpropionitrile), 2,2'-azobis(2,4-dimethylvaleronitrile), 2-phenylazo-4-methoxy-2,4-dimethylvaleronitrile, 2,2'-azobis(2,4,4-trimethylpentane), dimethyl 2,2'-azobis(2-methylpropionate), etc.; peroxyesters such as t-butylperoxyisobutylate, t-butylperoxypivalate, t-butylperoxy(2-ethylhexanoate), t-butylperoxyisopropylcarbonate, etc., peroxycarbonates such as diisopropylperoxydicarbonate, etc., diacyl peroxides such as benzoyl peroxide, 3,3,5-triethylhexanoyl peroxide, etc., dialkyl peroxides such as dicumyl peroxide, hydroperoxides such as t-butyl hydroperoxide, etc., peroxyketals such as 1,1-bis(t-butylperoxy)cyclohexane, etc., ketone peroxides such as cyclohexanone peroxide, etc., and other peroxides. When the polymerization is carried out under actinic rays, benzoin isopropyl ether, benzophenone, benzoin isobutyl ether, acetophenone, etc., may be used as a photoinitiator.

The amount of the above initiator for use based on the total amount of the components (A), (B), (C) and optionally (D) is preferably 0.001 to 10% by weight, more preferably 0.01 to 5% by weight.

The polymerization initiator to be used and the concentration thereof are determined by considering the composition and reactivity of the monomers, reaction rate control, etc.

The composition of this invention preferably contains an ultraviolet light absorber, e.g. in an amount of 0.01 to 3.0% by weight in order to improve the light resistance and weatherability of the resultant resin as required. When the amount of the ultraviolet light absorber is less than 0.01% by weight, there is almost no effect on improvement in weatherability. When it exceeds 3.0% by weight, the commercial value of the resultant product is liable to be impaired due to clear appearance of yellow coloring. The ultraviolet light absorber is widely selected, for example, from benzotriazole-containing, benzophenone-containing, salicylic acid-containing, and cyano acrylate-containing absorbers, and ultraviolet light stabilizers such as hindered amine-containing, Ni complex-containing and benzoate-containing stabilizers.

Further, when the polymerization is carried out, it is possible to incorporate additives such as a mold release agent, an antioxidant, an antistatic agent, various stabilizers, etc., and a blueing agent.

The polymerization method for radical-polymerizing the composition of this invention is not critical, and known polymerization methods may be employed. For example, the polymerization is carried out by filling the composition of this invention into a mold held with a gasket or a spacer and radical-polymerizing the composition.

The resin or resin molded product obtained may be surface-coated in order to improve optical and mechanical stability.

The resin of this invention as an optical material is excellent in transparency, surface smoothness, surface hardness, heat resistance, processability and impact resistance, and has a low specific gravity of 1.39 or less. Having a refractive index of not less than 1.570, which is higher than that of a diethylene glycol bisallylcarbonate resin (CR-39), the resin of this invention is excellent as an optical material. Further, the polymerization method therefor is simple, and the moldability thereof is excellent.

The resin of this invention is suitably usable in so-called lenses such as eyeglasses, a camera lens, etc., prisms, disks such as a video disk, mirrors such as a concave mirror, polygon, etc., and optical materials such as optical fibers, etc.

Examples of this invention will be described hereinafter, although this invention shall not be limited thereto. Methods for testing properties described in Examples are as follows.

Moldability: Evaluated on the following ratings:
(◯): Cast-molded exactly according to a mold.
(Δ): Peeling from a mold took place to a slight extent.
(X): Peeling, etc., took place extra-ordinarily.

Heat resistance

A lens was allowed to stand in a hot air oven at 120° C. for 1 hour, and then evaluated as follows.
(◯): No distortion of a reflected image on the lens surface was observed.
(Δ): Distortion was observed to some extent.
(X): Distortion was extraordinarily observed.

Processability

A lens was ground with a grinder for lenses of eyeglasses, and evaluated as follows.
(◯): The ground surface was excellent.
(Δ): The ground surface was good to some extent.
(X): The ground surface was inferior.

Appearance

Evaluated as follows.
(◯): Colorless and transparent.
(Δ): Colored yellowish to a slight extent.
(X): Colored yellowish clearly.

Refractive index and Abbe's number: Measured with an Abbe refractometer.

EXAMPLE 1

30 Parts by weight of N-(2-chlorophenyl)maleimide), 45 parts by weight of bisallyl diphenate, 25 parts by weight of a monomer of the general formula (3) in which Z was methyl, Y was hydrogen and p+q equaled 30, and 2 parts by weight of t-butylperoxy(2-ethylhexanoate) as a radical polymerization initiator were fully mixed to prepare a composition of this invention containing the initiator. This composition (mixed liquid) was cast into a casting mold formed of a glass mold and a gasket made of polyvinyl chloride, and heated from 40° C. to 120° C. over 20 hours. The resultant resin (lens) was transparent and colorless, and exhibited excellent moldability, heat resistance, processability, refractive index, Abbe's number and specific gravity as shown in Table 1.

EXAMPLES 2-18

Polymerization was carried out in the same manner as in Example 1 to give colorless and transparent lenses having a variety of compositions. Table 1 shows the results of evaluation of these lenses.

COMPARATIVE EXAMPLE 1

A mixed liquid containing 70 parts by weight of bisallyl diphenate, 30 parts by weight of a monomer of the general formula (3) in which Z was methyl, Y was hydrogen and p+q equaled 30 and 2 parts by weight of diisopropyl peroxydicarbonate as a radical polymerization initiator was prepared and polymerized in the same manner as in Example 1. The resultant lens was soft and showed that the polymerization was insufficient.

COMPARATIVE EXAMPLE 2

A mixed liquid containing 70 parts by weight of bisallyl diphenate, 30 parts by weight of a monomer of the general formula (3) in which Z and Y were hydrogen and p+q equaled 4, and 2 parts by weight of t-butylperoxy(2-ethylhexanoate) was prepared and polymerized in the same manner as in Example 1 to give a colorless and transparent lens. The so-obtained lens was insufficient in heat resistance, and caused distortion of a reflected image after annealed, as shown in Table 1.

COMPARATIVE EXAMPLE 3

A mixed liquid containing 30 parts by weight of N-(2-chlorophenylmaleimide), 70 parts by weight of bisallyl diphenate and 2 parts by weight of t-butylperoxy(2-ethylhexanoate) as a radical polymerization initiator was prepared and polymerized in the same manner as in Example 1 to give a colorless and transparent lens. The so-obtained lens was fragile and releasing from the glass mold took place as shown in Table 1.

COMPARATIVE EXAMPLE 4

A mixed liquid containing 100 parts by weight of bisally diphenate and 2 parts by weight of diisopropyl peroxydicarbonate as a radical polymerization initiator was prepared and polymerized in the same manner as in Example 1 to give a colorless and transparent lens.

COMPARATIVE EXAMPLE 5

A mixed liquid containing 70 parts by weight of bisallyl diphenate, 30 parts by weight of diallyl isophthalate and 2 parts by weight of diisopropyl peroxydicarbonate as a radical polymerization initiator was prepared and polymerized in the same manner as in Example 1 to give a colorless and transparent lens.

EXAMPLE 19

The lenses obtained in Examples 1 to 18 and Comparative Examples 3 to 5 were evaluated on impact resistance by a falling ball impact test using a steel ball having a diameter of ⅝ inch and a weight of 0.56 oz. Those lenses used had a central thickness ranging from 1.3 to 4 mm with a power of −4.00, or a central thickness ranging from 1.8 to 9 mm with a power of 0.00.

The evaluation was carried out by changing dropping heights stepwise from 0 inch to 100 inches until the lenses were fractured. The impact resistance is expressed by means of a height one step prior to the height from which the steel ball was dropped to cause the lens fracture. As shown in Table 2, the lenses obtained in Examples of this invention, those lenses obtained in Examples 1 and 2 in particular, exhibited excellent impact resistance.

TABLE 1

| No. | Composition and composition ratio (wt. %) | Moldability | Heat resistance | Processability | Appearance | Refractive index | Abbe's number | Specific gravity |
| --- | --- | --- | --- | --- | --- | --- | --- | --- |
| Example | | | | | | | | |
| 1 | CPMI/DPA/BPE1300 (30/45/25) | ◯ | ◯ | ◯ | ◯ | 1.578 | 34 | 1.27 |
| 2 | EPMI/DPA/BPE1300 (30/45/25) | ◯ | ◯ | ◯ | ◯ | 1.570 | 34 | 1.20 |
| 3 | CPMI/DPA/BPE1300/BzMA (25/45/20/10) | ◯ | ◯ | ◯ | ◯ | 1.582 | 32 | 1.29 |
| 4 | EPMI/DPA/BPE1300/PhEtOA (25/45/15/15) | Δ | ◯ | ◯ | ◯ | 1.576 | 33 | 1.22 |
| 5 | CPMI/DPA/BPE1300/TBA/BzMA (20/40/10/25/5) | ◯ | ◯ | ◯ | ◯ | 1.590 | 32 | 1.32 |
| 6 | EPMI/DPA/BPE1300/TBP/BzMA (20/40/10/22/8) | ◯ | ◯ | ◯ | ◯ | 1.591 | 32 | 1.39 |
| 7 | CPMI/DPA/BPE500 (30/45/25) | ◯ | ◯ | ◯ | ◯ | 1.585 | 32 | 1.30 |
| 8 | EPMI/DPA/BPE500 (30/45/25) | ◯ | ◯ | ◯ | ◯ | 1.575 | 34 | 1.21 |
| 9 | CPMI/DPA/BA611 (30/45/25) | ◯ | ◯ | ◯ | ◯ | 1.592 | 31 | 1.31 |
| 10 | EPMI/DPA/BA611 (30/45/25) | ◯ | ◯ | ◯ | ◯ | 1.582 | 33 | 1.22 |
| 11 | CPMI/DPA/BA611/BzMA (30/45/20/5) | ◯ | ◯ | ◯ | ◯ | 1.590 | 31 | 1.31 |
| 12 | CPMI/DPA/BA611/DAIP (30/45/10/15) | ◯ | ◯ | ◯ | ◯ | 1.595 | 32 | 1.32 |
| 13 | CPMI/DPA/BA611/TBP/BzMA (15/35/25/20/5) | ◯ | Δ | ◯ | ◯ | 1.593 | 32 | 1.36 |
| 14 | EPMI/DPA/BA611/TBP/BzMA (20/40/20/15/5) | Δ | ◯ | ◯ | ◯ | 1.591 | 32 | 1.33 |
| 15 | CPMI/DPA/BA611/TBA/DAIP (20/40/10/15/15) | ◯ | ◯ | ◯ | ◯ | 1.594 | 32 | 1.33 |
| 16 | EPMI/DPA/BAE02 (35/45/20) | ◯ | ◯ | ◯ | ◯ | 1.586 | 32 | 1.24 |
| 17 | EPMI/DPA/BAE02/PhEtOA (30/45/20/5) | Δ | ◯ | ◯ | ◯ | 1.585 | 32 | 1.24 |
| 18 | EPMI/DPA/BAE02/TMTA (30/45/15/10) | ◯ | Δ | ◯ | ◯ | 1.585 | 32 | 1.24 |
| Comparative Example | | | | | | | | |
| 1 | DPA/BPE1300 (70/30) | ◯ | X | X | ◯ | 1.576 | 33 | 1.22 |
| 2 | DPA/BA611 (70/30) | ◯ | X | Δ | ◯ | 1.588 | 31 | 1.23 |
| 3 | CPMI/DPA (30/70) | Δ | ◯ | ◯ | Δ | 1.602 | 29 | 1.31 |
| 4 | DPA | ◯ | ◯ | ◯ | ◯ | 1.601 | 29 | 1.23 |

TABLE 1-continued

| No. | Composition and composition ratio (wt. %) | Moldability | Heat resistance | Processability | Appearance | Refractive index | Abbe's number | Specific gravity |
|---|---|---|---|---|---|---|---|---|
| 5 | DPA/DAIP (70/30) | ◯ | ◯ | ◯ | ◯ | 1.591 | 31 | 1.24 |

Abbreviations in Table 1:
CPMI: N-(2-chlorophenylmaleimide)
EPMI: N-(2,6-diethylphenylmaleimide)
DPA: bisallyl diphenate
BPE1300: monomer of the general formula (3) wherein Z = methyl, Y = hydrogen and p + q = 30
BPE500: monomer of the general formula (3) wherein Z = methyl, Y = hydrogen and p + q = 10
BA611: monomer of the general formula (3) wherein Z = hydrogen, Y = hydrogen and p + q = 4
BAE02: monomer of the general formula (3) wherein Z = hydrogen, Y = hydrogen and p + q = 2 (2,2'-bis(4-acryloxyethoxyphenyl)propane)
BzMA: benzyl methacrylate
PhEtOA: Phenoxyethyl acrylate
TBP: 2,4,6-tribromophenyl methacrylate
TBA: 2,2'-bis(2,6-dibromo-4-methacryloxyethoxyphenyl)propane
DAIP: diallyl isophthalate
TMTA: triallyl trimellitate

TABLE 2

| Lens No. | −4.00 | 0.00 |
|---|---|---|
| Ex. | | |
| 1 | Not fractured | Not fractured |
| 2 | Not fractured | Not fractured |
| 3 | 71 inches | 87 inches |
| 4 | 66 inches | 80 inches |
| 5 | 61 inches | 73 inches |
| 6 | 64 inches | 76 inches |
| 7 | 52 inches | 66 inches |
| 8 | 51 inches | 64 inches |
| 9 | 51 inches | 62 inches |
| 10 | 52 inches | 65 inches |
| 11 | 48 inches | 61 inches |
| 12 | 43 inches | 58 inches |
| 13 | 49 inches | 62 inches |
| 14 | 44 inches | 60 inches |
| 15 | 45 inches | 61 inches |
| 16 | 46 inches | 59 inches |
| 17 | 46 inches | 58 inches |
| 18 | 44 inches | 59 inches |
| Com. Ex. | | |
| 3 | 21 inches | 51 inches |
| 4 | 29 inches | 53 inches |
| 5 | 20 inches | 51 inches |

What is claimed is:

1. A composition for an optical material, which comprises:

(A) N-phenylmaleimide of the general formula (1)

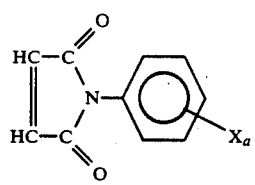

wherein X is an aliphatic group having 1 to 5 carbon atoms, an aromatic group or a halogen atom and a is an integer of 1 to 5, (B) di(meth)allyl diphenate of the general formula (2),

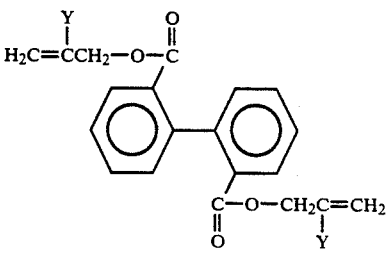

wherein Y is a hydrogen atom or a methyl group, and (C) bisphenol ester of the general formula (3),

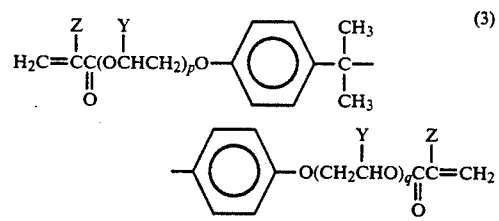

wherein each of Y and Z is, independently of the other, a hydrogen atom or a methyl group, p and q are positive integers, and p+q equals 2 to 50, the amount of the above component (A) being 1 to 50% by weight based on the total weight of the components (A), (B) and (C), the amount of the above component (B) being 5 to 50% by weight based on said total weight, the amount of the above component (C) being 1 to 30% by weight based on said total weight.

2. The composition of claim 1, which further comprises 1 to 50% by weight, based on the total amount of the components (A), (B), (C) and (D), of a compound (D) which is different from any of the components (A), (B) and (C) and contains at least one radical-polymerizable functional group having a carbon-carbon double bond in the molecule.

* * * * *